United States Patent [19]

Shore

[11] 4,436,283
[45] Mar. 13, 1984

[54] GATE VALVE

[76] Inventor: John H. Shore, 8 Cherokee St., Shawnee, Okla. 74801

[21] Appl. No.: 373,004

[22] Filed: Apr. 29, 1982

[51] Int. Cl.³ ............................................. F16K 25/00
[52] U.S. Cl. ..................................... 251/174; 251/327; 251/329; 251/330
[58] Field of Search ............... 251/172, 174, 327, 328, 251/329, 330

[56] References Cited

U.S. PATENT DOCUMENTS

| | | | |
|---|---|---|---|
| 2,480,529 | 8/1949 | Waag | 251/174 X |
| 2,660,191 | 11/1953 | Volpin | 251/327 X |
| 2,810,542 | 10/1957 | Bryant | 251/172 |
| 3,006,599 | 10/1961 | Eckert | 251/174 X |
| 3,111,137 | 11/1963 | Carlin | 251/327 X |
| 4,020,864 | 5/1977 | Church | 251/174 X |
| 4,377,273 | 3/1983 | Beson | 251/328 X |

Primary Examiner—Harold W. Weakley
Attorney, Agent, or Firm—Laney, Dougherty, Hessin & Beavers

[57] ABSTRACT

A gate valve including a valve body having a first bore therethrough for accommodating a reciprocating gate, and further having a second cylindrical bore extending normal to the first bore for fluid flow through the valve. A pair of opposed counterbores are formed in the body adjacent, and on opposite sides of, the first bore and in concentric, axial alignment with the second bore. Annular upstream and downstream seats are seated in the counterbores. A wave spring resting on a shoulder in the body at the bottom of one of the counterbores biases the upstream seat against the gate and maintains sealing when the valve is open.

A bonnet is slidably extended through an opening in the valve body, and is forced by fluid pressure into sealing engagement with the body.

2 Claims, 6 Drawing Figures

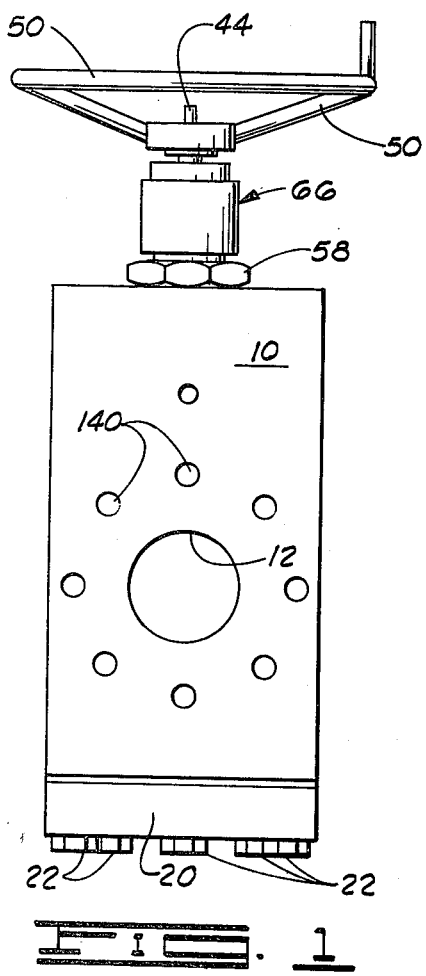
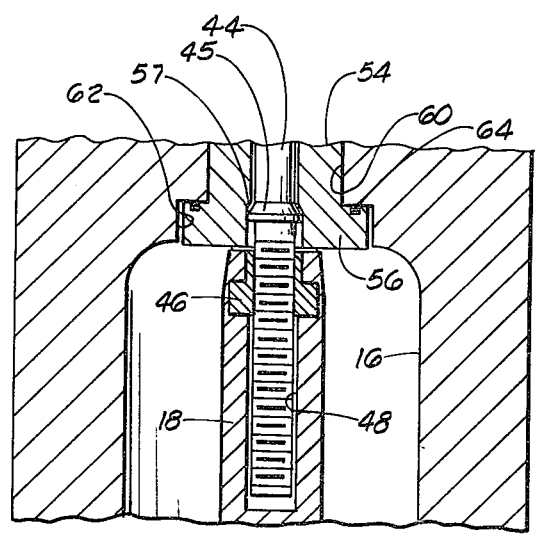
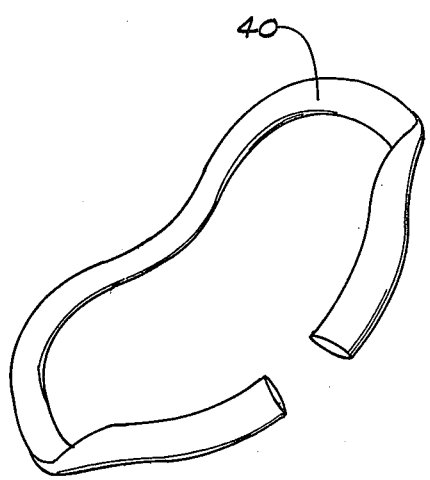

GATE VALVE

BACKGROUND OF THE INVENTION

1. Field of the Invention

This invention relates to gate valves, and particularly to gate valves which are intended to function in a lie-down or substantially horizontal position in which the gate of the valve extends in a substantially horizontal plane.

2. Brief Description of the Problem Solved by the Invention

With some types of gate valves used in oil field service, the valve is usually employed in a lie-down or horizontally extending position in which the fluid flows through the valve in a generally vertical direction, and the gate of the valve extends in a substantially horizontal plane. In this mode of operation, some difficulty is experienced at times in maintaining an efficient seal between the seats of the valve and the gate, particularly when the gate is in an open position. Such tendency toward inadequacy of sealing capability is due in part to gravitational action on the gate and upstream seat of the valve tending to allow them to drift or move away from the downstream seat.

BRIEF DESCRIPTION OF THE PRESENT INVENTION

The present invention provides an improved gate valve which is particularly well suited for use in a horizontal or lie-down position.

Broadly described, the present invention includes a body which has a cylindrical gate chamber bored thereinto from one side of the body, and a fluid flow passageway of cylindrical cross section bored through the body in a direction normal to the gate chamber. The cylindrical gate chamber is closed by a closure plate secured to one side of the body, and a gate is reciprocably mounted in the gate chamber for reciprocation in a direction normal to the axis of the fluid flow passageway bore. The gate is connected to an elongated stem which projects through a valve bonnet slidably mounted through the valve body on the opposite side thereof from the valve closure plate. The bonnet has a flanged inner end which bears against a shoulder in the valve body and is sealed thereagainst by means of an O-ring placed around the internal bonnet flange. Outside the valve body, the exterior of the bonnet is threaded to receive a retaining nut which threads along the bonnet until it contacts the exterior of the valve body.

Within the valve body, a pair of counterbores are formed in the body in axial alignment with, and concentric to, the fluid flow passageway bore through the valve body. The two counterbores are disposed on opposite sides of the cylindrical gate chamber and open into the cylindrical gate chamber. Each counterbore terminates at a shoulder formed in the valve body, which shoulder extends concentrically around the fluid flow passageway bore through the valve body. At one of these shoulders, a wave spring is seated and bears against one end of a valve seat positioned in the respective counterbore. A similar valve seat is positioned in the counterbore on the opposite side of the gate chamber. The wave spring resiliently urges or biases the seat against which it bears into sealing engagement with the gate.

An object of the invention is to provide a gate valve which is well adapted for use in a lay-down or horizontal position, and which is constructed to maintain a fluid tight seal between the gate and the valve seats which cooperate therewith under such operating condition.

A further object of the invention is to provide an easily mounted valve bonnet which is automatically sealed against the valve body by internal pressure within the valve when the valve is in use.

A further object of the invention is to provide an improved gate valve which is relatively simple in construction, and is characterized in having a long and trouble-free operating life.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 1 is a side elevation view of the gate valve of the invention.

FIG. 3 is a detailed view of the connection of the valve stem to the gate as this connection appears when viewed at 90° to the depiction of this structure in FIG. 2.

FIG. 6 is a perspective view of the wave spring employed in the gate valve of the invention for maintaining a continuous resilient bias against the upstream seat utilized in the gate valve.

DETAILED DESCRIPTION OF PREFERRED EMBODIMENTS OF THE INVENTION

Figure 2:
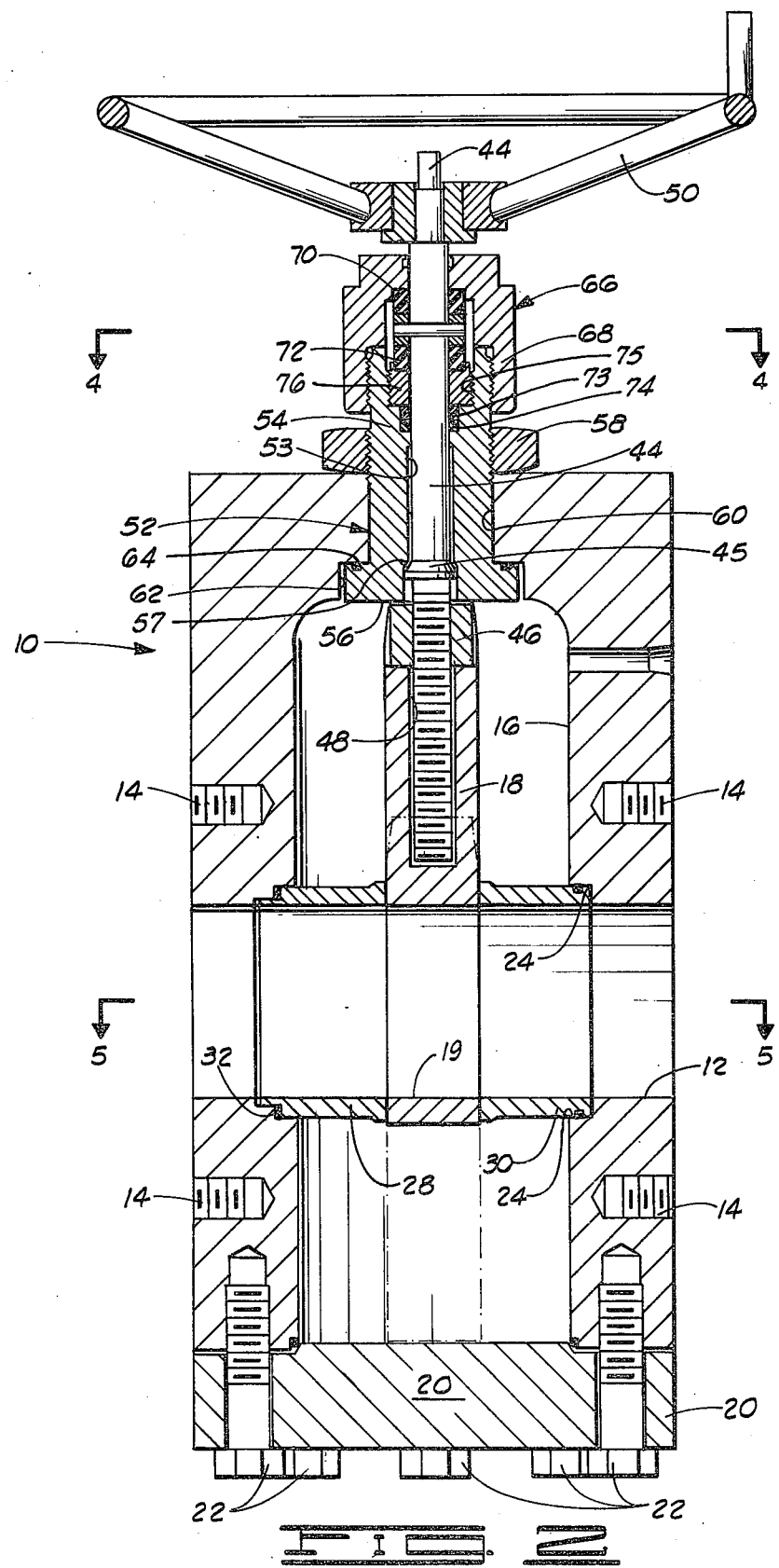
FIG. 2 is a sectional view taken along line 2—2 of FIG. 1.
Figure 4:
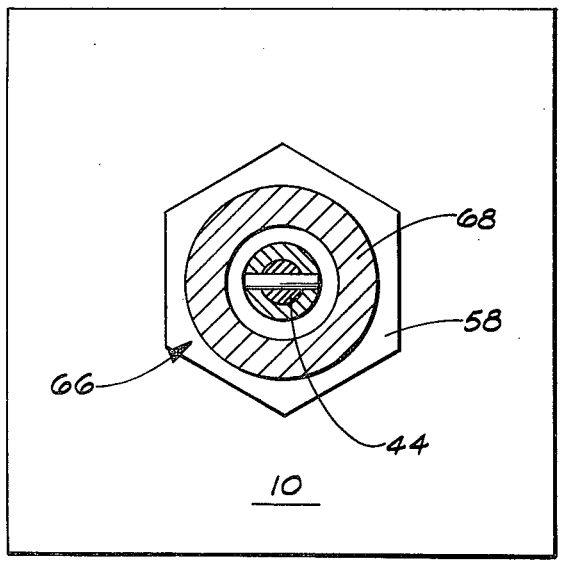
FIG. 4 is a sectional view taken along line 4—4 of FIG. 2.

The gate valve of the invention includes a valve body 10 which is of generally right parallelepiped configuration, and which is provided with a transversely extending bore 12 which passes through the body and forms a fluid passageway for the flow of fluid through the valve. The bore 12 is surrounded by a plurality of threaded bolt cavities 14 in the body 10 to facilitate bolting the valve in a fluid flow line in which the flow of fluid is to be controlled. The valve body 10 defines a cylindrical gate bore 16 (see FIG. 2) formed into the body from one side thereof, and this bore forms a gate cavity accommodating the gate 18 of the valve. The gate 18 is a flat plate having a fluid flow opening 19 therethrough, and is reciprocably mounted in the bore 16. The bore 16 extends substantially normal to the bore 12 forming the fluid flow passageway, and the two intersect in the center of the body 10. The bore 16 forming the gate cavity is closed by means of a closure plate 20 which is secured over the opening to the bore 16 and fastened to the body 10 by a plurality of bolts 22.

Figure 5:
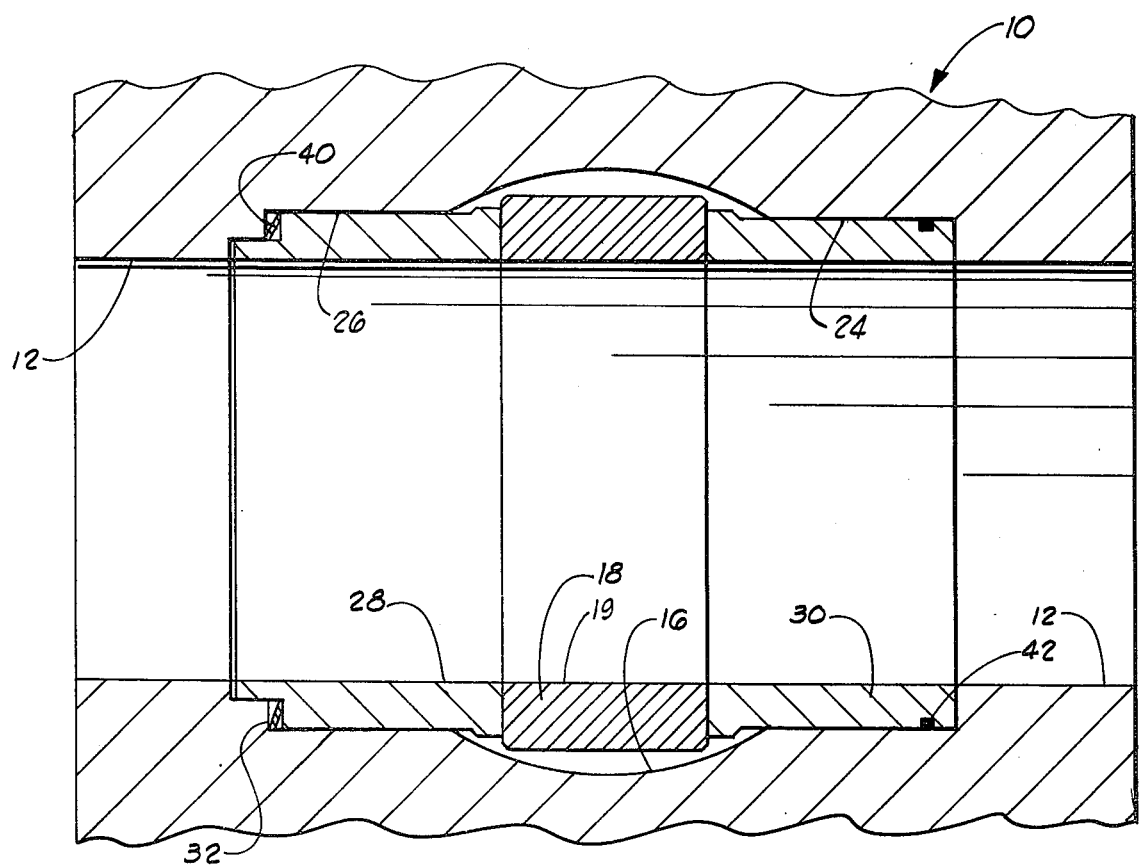
FIG. 5 is a sectional view taken along line 5—5 of FIG. 2.

It will be noted in referring to FIG. 2 that the fluid flow passageway bore 12 intersects and is aligned with a pair of counterbores 24 and 26. These are also illustrated in FIG. 5 of the drawings. The counterbores 24 and 26 are located at opposite sides of the gate cavity formed by the bore 16, and will be referred to as the downstream counterbore and the upstream counterbore, respectively. The counterbores 24 and 26 are concentric with respect to the bore 12 and are in axial alignment therewith. The counterbores 24 and 26 function to accommodate a pair of valve seats. Thus, the upstream counterbore 26 accommodates an upstream seat 28, and the downstream counterbore 24 accommodates a downstream seat 30. The upstream seat is fitted in the respective counterbore 26 so that it can move axially therein.

Near the inner end of the counterbore 26, an annular shoulder 32 is formed. A wave spring 40 of annular configuration is placed against the shoulder 32 and functions to resiliently bias the upstream seat 28 against one side of the gate 18.

The downstream seat 30 fits slidably into the counterbore 24, and is sealed against the valve body 10 by means of an annular O-ring seal 42. The radially inner end of the downstream valve seat 30 bears against the opposite side of the gate 18 from the side which is sealingly contacted by the upstream seat 28.

For the purpose of reciprocating the gate 18 within the gate cavity formed by the cylindrical bore 16, an elongated stem 44 is threaded through a T-shaped block 46 positioned in a complementary cavity formed in the upper end of the gate 18. The stem carries a tapered back seating element 45 for achieving back-seating and sealing when parts of the valve are removed for maintainance and servicing while the valve is under pressure. The gate 18 further includes an elongated bore 48 which projects axially within the gate 18 and receives the threaded inner end of the elongated valve stem 44. When the valve stem 44 is rotated by the rotation of an operating handle 50 connected to its outer end, the gate 18 is caused to reciprocate within the gate cavity inside the body 10, and shifts from an open position, shown in full lines in FIG. 2, to a closed position illustrated in dashed lines.

The valve stem 44 extends from the gate 18 upwardly through a stem opening 53 formed through a bonnet 52. The bonnet 52 includes an elongated, cylindrical rigid neck portion 54 which carries an annular flange 56 at one of its ends, and which defines a back seat 57. The back seat 57 sealingly cooperates with the back seating element 45 in one operative position of the valve. Around the central portion of the rigid, cylindrical neck portion of the bonnet, an external thread is formed, and is engaged by a bonnet retaining nut 58. The bonnet retaining nut 58 draws the bonnet upwardly within the body 10 so that it is fitted in an accommodating opening 60 formed in the body 10. The annular flange 56 is then disposed in a flange cavity 62 which is aligned with and communicates with the opening 60. The upper side of the annular flange 56 on the bonnet bears against an O-ring seal 64 which is located between the annular flange 56 and a shoulder formed at the intersection of the flange cavity 62 and the bonnet opening 60.

The upper end of the bonnet 52 is closed by a bearing housing assembly designated generally by reference numeral 66. The bearing housing assembly 66 includes a cap nut 68 and a pair of ball type thrust bearings 70 and 72. A counterbore 73 is formed in the top end of the bonnet 52 to accommodate a seal assembly 74 which seals against the counterbore and stem 44. A larger threaded counterbore 75 communicates with the counterbore 73 and threadedly receives a retainer 76.

In the operation of the gate valve of the invention, it is generally employed in a lie-down or horizontal position in which the gate reciprocates in a horizontal plane. In such position, a tendency exists for the upstream seat 28 and gate 18 to drift away from the downstream seat 30 under the influence of gravity, thus allowing fluid to leak between the downstream seat and the gate. By the inclusion of the wave spring 40 at the illustrated location between the upstream seat 28 and the body 10, this upstream seat is continuously biased against the gate to maintain an effective seal.

Another feature of the invention entails the ease with which the bonnet 52 can be assembled into the valve body. The bonnet 52 can be fitted easily into the bonnet opening 60 with the flange 56 thereof in the flange cavity 62. When the bonnet retaining nut 58 is threaded down on the bonnet into contact with the body 10, the bonnet is drawn upwardly so as to compress the seal ring 64 between the flange 56 and the body 10, thus assuring that no fluid can leak around the bonnet to the outer side of the valve body.

Although a preferred embodiment of the invention has been herein described, it will be understood that various changes and innovations in the illustrated embodiment of the gate valve of the invention can be effected without departure from the basic principles of the invention. Changes and innovations of this type are therefore deemed to be circumscribed by the spirit and scope of the invention except as the same may be necessarily limited by the appended claims, or reasonable equivalents thereof.

What is claimed is:

1. A gate valve especially adapted for use in a horizontal position in which the gate thereof reciprocates in a substantially horizontal plane comprising:
   a valve body having a cylindrical bore projecting into one side of the body and forming a gate chamber in the body for the accommodation of the gate of the valve;
   a gate reciprocably mounted in said gate chamber;
   a closure plate removably secured to said valve body and extending across and closing the opening to said bore at one side of the valve body;
   a bonnet opening formed in said valve body on the opposite side thereof from said closure plate and communicating with said bore;
   fluid flow passageway means in said valve body for permitting fluid to flow through said gate valve when said gate is open, said fluid flow passageway means comprising:
      a first bore portion projecting into said valve body along an axis extending normal to the axis of said cylindrical bore forming said gate valve chamber;
      an upstream seat counterbore registering with and opening into said first bore portion, said upstream seat counterbore being disposed in concentric and coaxial relationship to said first bore portion and projecting from said first bore portion to said gate bore, and communicating at one of its open ends with said gate bore;
      a second bore portion projecting into the opposite side of said valve body from said first bore portion and in axial alignment with said first bore portion;
      a downstream seat counterbore aligned with and opening into said second bore portion, said downstream seat counterbore being concentric and coaxially related to said second bore portion, and said downstream seat counterbore extending from said second bore portion to said gate bore and opening into said gate bore on the opposite side thereof from said upstream seat counterbore;

a first shoulder formed at the intersection of said first bore portion and said upstream seat counterbore; and a second shoulder formed at the intersection of said second bore portion and said upstream seat counterbore;

an annular wave spring bearing against said first shoulder and concentrically surrounding the axes of said upstream seat counterbore and said first bore portion;

an annular upstream seat slidably mounted in said upstream seat counterbore and having a first end bearing against said wave spring and a second end bearing against one side of said gate;

an annular downstream seat slidably mounted in said downstream seat counterbore and concentrically surrounding the axes of said downstream seat counterbore and said second bore portion, said downstream seat having a first end adjacent said second shoulder and having a second end in contact with the opposite side of said gate from the side contacted by said upstream seat;

a bonnet including a neck portion projecting through said bonnet opening and carrying external threads at a location outside said valve body, said bonnet further including an annular flange at the end of said neck portion inside said valve body;

sealing means between said annular flange and said valve body;

bonnet retainer means threadedly engaged with the external threads on said neck portion and located outside said valve body;

a valve stem having a first end threadedly and adjustably connected with said gate for causing reciprocation of said gate when said valve stem is rotated, and having a second end outside said valve body;

an operating handle outside said body and connected to said valve stem for rotation of the valve stem when said operating handle is rotated; and packing means secured to the end of said bonnet outside said valve body and packingly surrounding said valve stem.

2. A gate valve especially adapted for use in a horizontal position in which the gate thereof reciprocates in a substantially horizontal plane comprising:

a valve body having a cylindrical bore projecting into one side of the body and forming a gate chamber in the body for the accommodation of the gate of the valve;

a gate reciprocably mounted in said gate chamber;

a closure plate removably secured to said valve body and extending across and closing the opening to said bore at one side of the valve body;

a bonnet opening formed in said valve body on the opposite side thereof from said closure plate and communicating with said bore;

fluid flow passageway means in said valve body for permitting fluid to flow through said gate valve when said gate is open, said fluid flow passageway means comprising:

a first bore portion projecting into said valve body along an axis extending normal to the axis of said cylindrical bore forming said gate valve chamber;

an upstream seat counterbore registering with and opening into said first bore portion, said upstream seat counterbore being disposed in concentric and coaxial relationship to said first bore portion and projecting from said first bore portion to said gate bore, and communicating at one of its open ends with said cylindrical gate bore;

a second bore portion projecting into the opposite side of said valve body from said first bore portion and in axial alignment with said first bore portion;

a downstream seat counterbore aligned with and opening into said second bore portion, said downstream seat counterbore being concentric and coaxially related to said second bore portion, and said downstream seat counterbore extending from said second bore portion to said gate bore and opening into said gate bore on the opposite side thereof from said upstream seat counterbore;

a first shoulder formed at the intersection of said first bore portion and said upstream seat counterbore; and a second shoulder formed at the intersection of said second bore portion and said upstream seat counterbore;

an annular wave spring bearing against said first shoulder and concentrically surrounding the axes of said upsteam seat counterbore and said first bore portion;

an annular upstream seat slidably mounted in said upstream seat counterbore and having a first end bearing against said wave spring and a second end bearing against one side of said gate;

an annular downstream seat slidably mounted in said downstream seat counterbore and concentrically surrounding the axes of said downstream seat counterbore and said second bore portion, said downstream seat having a first end adjacent said second shoulder and having a second end in contact with the opposite side of said gate from the side contacted by said upstream seat;

a bonnet including a neck portion projecting through said bonnet opening and carrying threads at a location outside said valve body, said bonnet further including a flange at the end of said neck portion inside said valve body;

sealing means between said flange and said valve body;

bonnet retainer and packing means threadedly engaged with the threads on said neck portion and located outside said valve body, said bonnet retainer and packing means including a packing adapted for packingly surrounding a valve stem; and means bearing against said valve body for retaining said bonnet in a fixed position in said valve body;

a valve stem having a first end adjustably connected with said gate for causing reciprocation of said gate when said valve stem is rotated, and having a second end outside said valve body, said valve stem being in packed off engagement with said packing; and an operating handle outside said body and connected to said valve stem for rotation of the valve stem when said operating handle is rotated.

* * * * *